United States Patent [19]

Tsukada

[11] Patent Number: 4,973,242
[45] Date of Patent: Nov. 27, 1990

[54] METAL MOLD FOR INJECTION MOLDING TUBULAR OR COLUMNAR PRODUCTS AND MOLDED PRODUCT OBTAINED BY USING SAME

[75] Inventor: Mitsuhiro Tsukada, Fuji, Japan

[73] Assignee: Polyplastics Co., Ltd., Osaka, Japan

[21] Appl. No.: 333,250

[22] Filed: Apr. 5, 1989

[30] Foreign Application Priority Data

Apr. 15, 1988 [JP] Japan .................. 63-92870

[51] Int. Cl.$^5$ ............................................. B29C 45/03
[52] U.S. Cl. ..................................... 425/567; 249/105; 249/144; 425/577
[58] Field of Search ............... 425/547, 577, 812, 567; 249/78, 79, 141, 117, 105, 144; 264/328.9; 428/36.9, 36.92, 35.6, 35.7

[56] References Cited

U.S. PATENT DOCUMENTS

| | | | |
|---|---|---|---|
| 4,101,699 | 7/1978 | Stine et al. | 428/35.7 |
| 4,126,291 | 11/1978 | Gilbert et al. | 425/577 |
| 4,483,891 | 11/1984 | Cerny | 428/36.7 |
| 4,707,389 | 11/1987 | Ward | 428/36.6 |
| 4,787,596 | 11/1988 | Folding et al. | 425/577 |

Primary Examiner—James Seidleck
Attorney, Agent, or Firm—Nixon & Vanderhye

[57] ABSTRACT

A metal mold for injection molding tubular or columnar products is provided in which those portions of matching surfaces of the metal mold members close to end portions of an annular or cylindrical cavity are provided with grooves extending continuously or intermittently so as to surround the cavity's end portions.

1 Claim, 6 Drawing Sheets

METAL MOLD FOR INJECTION MOLDING TUBULAR OR COLUMNAR PRODUCTS AND MOLDED PRODUCT OBTAINED BY USING SAME

FIELD OF INVENTION

This invention relates to a metal mold used to obtain highly accurate injection molded thermoplastic. The invention also relates to tubular or columnar products of molded product obtained using such metal mold.

BACKGROUND AND SUMMARY OF THE INVENTION

The description of the present invention that follows is directed to both a tubular molded product and a columnar molded product. Since techniques for molding a tubular product are more complicated, However, when the words "tubular (columnar)" appear in the following description, it is intended to refer to both a tubular molded product and a columnar molded product.

Molded products consisting of a thermoplastic resin have been utilized as replacements for metal products since the former can be made relatively easily and efficiently by injection molding techniques.

However, the dimensional accuracy of an injection molded resin product is generally inferior to that of product produced by cutting or shading a piece of stock. serious problems can thus arise in many cases in a tubular (columnar) molded product which demands, due to its intended end-use application, high dimensional accuracy, and especially roundness (magnitude of roundness deviation of an actual product from that of a geometrically correct circle, and errors of various diameters of a predetermined circular cross section of an actual product) and cylindricity (magnitude of cylindrical deviation of an actual product from that of a geometrically correct cylinder, and differences between the sizes (diameters) of various circular cross sections of a tube (column)).

On the other hand, the dimensional accuracy of a tubular molded product to be obtained by conventional injection molding methods is improved generally by regulating the temperature of the metal mold to as uniform a level as possible. In this regard, attempts to improve the dimensional accuracy of injection molded products have included regulating the temperature of the product core (which easily receives and accumulates therein the heat radiated from the resin, and which constitutes the inner hollow of a final tubular product) with a heat pipe or cooling air.

Even when such a conventional technique is used, a product core in which the heat may be accumulated is cooled uniformly, so as to minimize and change the occurrence of voids in the resin and resin shrinkage. This enables a molded product of a comparatively high accuracy to be obtained. Although this method is considerably effective, especially in improving the roundness which is one of the important accuracy determining elements for a tubular molded product, it is substantially ineffective in improving the other important accuracy determining element i.e., cylindricity. This method is not capable of preventing a phenomenon in which the outer diameter of an end portion of a tubular molded product becomes larger than that of an intermediate portion thereof. More specifically, a tubular molded product obtained by this method becomes divergent at the outer circumferences of the end portions thereof as shown in FIG. 5C. Even in the case where the temperature of a metal mold is regulated so as to attain a uniform level and improve the accuracy of a final columnar molded product, it is inevitable that the a product thereby obtained will be deformed due to the shrinkage of an intermediate portion thereof. Moreover, such a product will be divergent at the circumferential end portions thereof in the same manner as the tubular molded product referred to above. The presently available injection molding technique does not meet in many cases the requirements for the production of a tubular (columnar) part having a high dimensional accuracy, and especially, a high cylindricity. In such cases, tubular (columnar) products obtained by injection molding are thereafter subjected to further processes, for example, which thereby results in higher manufacturing costs. Thus, what has been needed are improved and economically advantages cutting techniques for producing a tubular (columnar) molded product having high dimensional accuracy.

The present invention is directed to a metal mold for injection molding tubular (columnar) products, characterized in that the portions of matching surfaces of metal mold members which are close to end portions of an annular (cylindrical) cavity are provided with grooves extending continuously or intermittently so as to surround the end portions of the annular (cylindrical) cavity. The invention also relates to a tubular (columnar) molded product of a thermoplastic resin molded by this metal mold.

BRIEF DESCRIPTION OF THE ACCOMPANYING DRAWINGS

FIGS. 6-14 show various modes of embodiment of the tubular (columnar) molded products obtained according to the present invention, wherein FIGS. 6A-14A and 6B-14B are perspective views and sectional views, respectively.

DETAILED DESCRIPTION OF THE PREFERRED EMBODIMENT

The present invention will now be described on the basis of the production of a tubular molded product, a typical molded product obtained according to the present invention, with reference to the accompanying drawings.

Figure 5A:
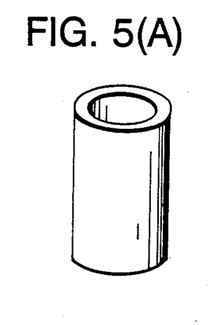
FIGS. 5A and 5B are a perspective view and a sectional view, respectively of a particularly preferred embodiment of this invention.
Figure 5B:
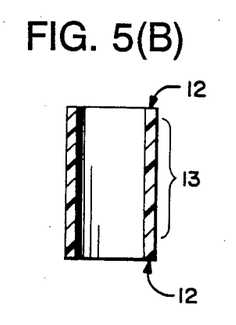
Figure 5C:
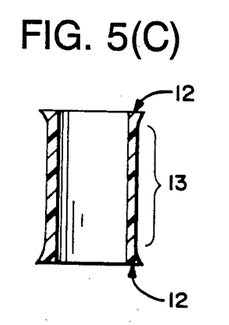
FIG. 5C is a sectional view schematically showing the condition of warp, which causes a decrease in cylindricity, occurring in a tubular molded product obtained by using a conventional metal mold.

A preferred tubular molded product is shown in FIGS. 5A and 5B. FIG. 5C schematically shows the shape of an actual molded product which is obtained by molding a resin with a view to forming such a tubular molded product as is shown in FIGS. 5A and 5B, and which is made in a conventional, generally-used metal mold by carrying out the step of cooling the metal mold to a uniform level with the core simultaneously cooled. As previously mentioned, such a tubular molded product becomes divergent at the outer circumferences of the end portions thereof, so that the outer diameters of the parts of this tubular molded product which are in the vicinity of the end portions 12 thereof become larger than that of an intermediate portion 13 thereof. That is, it is inevitable that the cylindricalness of such a molded product is not sufficiently high level.

Figure 1:
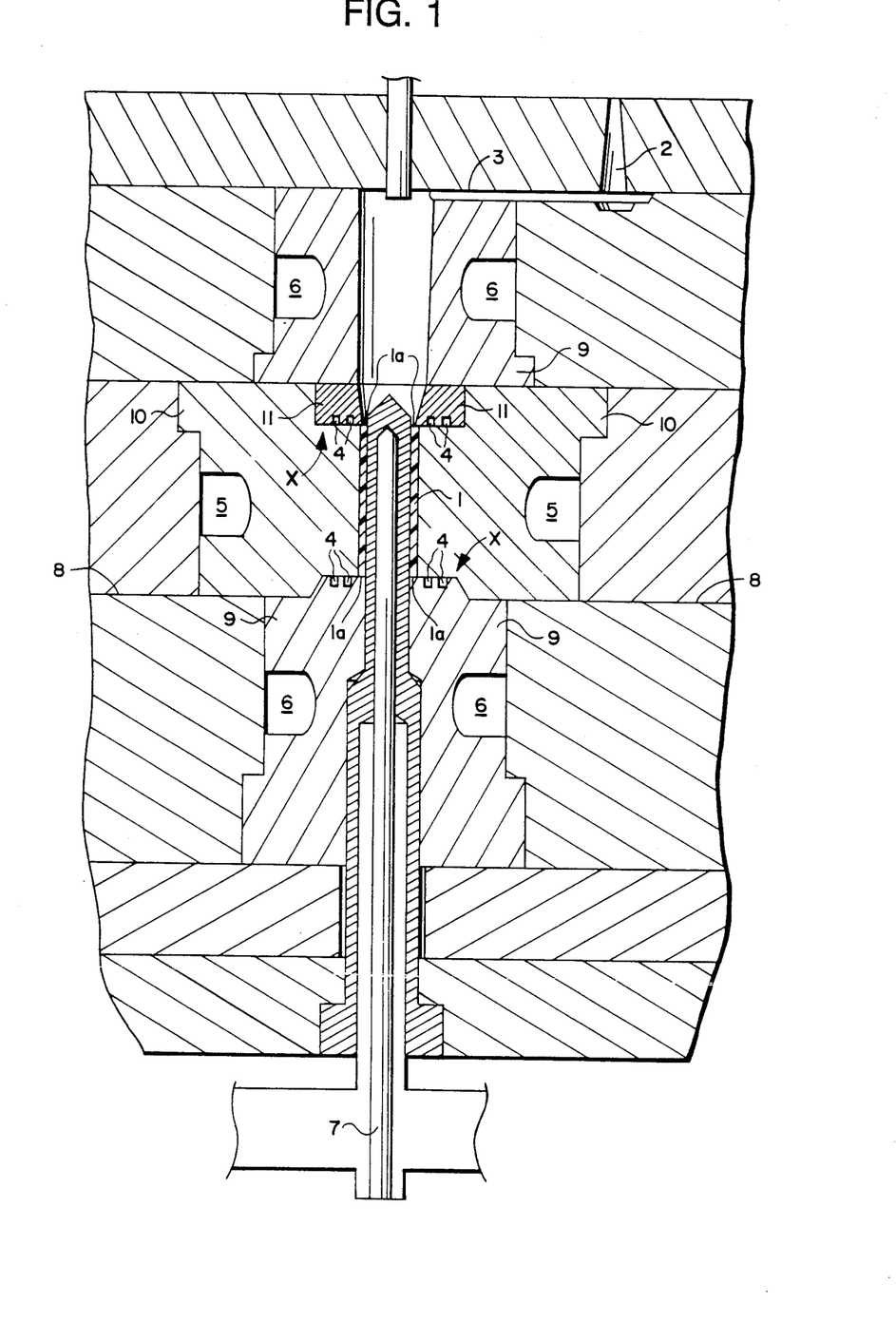
FIG. 1 is a schematic section of an embodiment of the metal mold for injection molding tubular (columnar) products according to the present invention.
Figure 2:
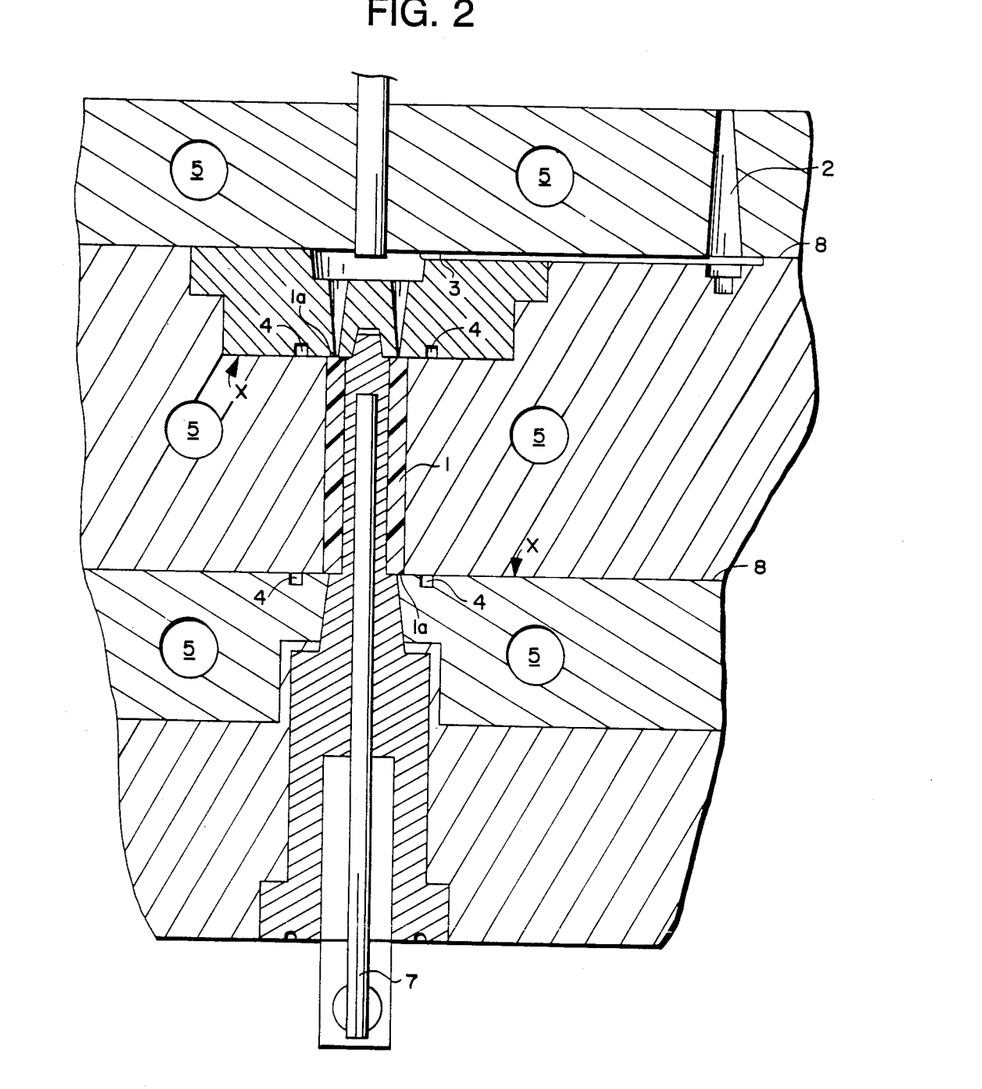
FIG. 2 is a schematic section of another embodiment of the present invention, the metal molds shown in FIGS. 1 and 2 being the same metal molds as are used in Examples 1-9 and 10.

On the other hand, the injection metal mold used for obtaining a tubular molded product according to the present invention has construction shown in, for example, FIG. 1 or 2. As can be seen in these Figures, the mold according to the present invention includes an annular cylindrical mold cavity 1 in which the tubular molded products are molded. The mold cavity 1 includes opposing end portions 1a. Molten thermoplastic resin is injected into the cavity 1 via sprue 2 which communicates with the cavity 1 via runner 3. Fluid passages 5 (FIG. 2) and 6 (FIG. 1) are defined in the mold blocks 9 for the purpose of circulating a cooling fluid and thereby regulate the temperature of the mold cavity 1. Parting surfaces 8 are defined between respective faces of the mold blocks 9 and mold blocks 10—that is, the parting surfaces 8 define the transverse end surfaces of the tubular product molded within cavity 1. A heat pipe 7 is provided in operative associated with the mold cavity 1 so as to control the temperature within the mold cavity 1.

According to the present invention, annular grooves 4 are provided in surrounding relationship to the end portions 1a of the mold cavity 1a. As will be discussed in greater detail below, these grooves serve to equalize the radiant heat loss as between the end portions of the molded product within the cavity 1 and its mid portion so as to prevent shrinkage and/or warpage (resulting in divergent end portions of the molded product). More specifically, the characteristics of the metal mold of the present invention reside in that the portions of the matching surfaces X of the metal mold which are close to the end portions 1a of a cavity 1 for a tubular molded product are provided with grooves 4 surrounding the end portions 1a of the cavity 1 This arrangement reduces the occurrence of the above-mentioned divergent circumferential projections at the end portions of a tubular molded product. Accordingly, a tubular molded product having highly accurate cylindricity is obtained.

The matching surfaces X, in which the grooves 4 constituting the characteristics of the present invention are formed, are defined by contacting the surfaces between blocks 9 and 10 and core 11 (see FIG. 1).

The shape of the grooves 4 provided in such surfaces is not specially limited. These grooves 4 may be formed to an desire shape, i.e., circular, elliptical, square or polygonal shape. In short, such grooves 4 may be formed to any shape that permits them to be provided so as to continuously or intermittently surround the end portions of the annular mold cavity 1.

FIGS. 3A-3D show the examples of the shape of such grooves 4, which are all effective. The shape of the grooves provided in the metal mold according to the present invention is not, of course, limited to those shown in the Figures.

A groove 4 provided close to an end portion of the annular cavity 1 performs more effectively. Therefore, it is preferable that grooves 4 be provided so that they are positioned in the portions of the matching surfaces which are within 20 mm, especially, 15 mm from the outer. circumferences of the end portions 1a of the mold cavity 1.

Figure 3A:
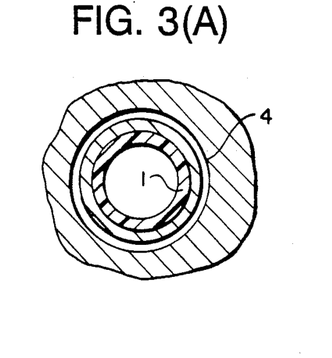
FIGS. 3A-3D are plan views of examples of grooves provided in the metal mold according to the present invention, with FIGS. 3A-3C specifically showing the groove shapes of the metal mold of FIG. 1 which were evaluated in Examples 1-9, and with the groove shape shown in FIG. 3D being provided in the metal mold of FIG. 2 which was evaluated in Example 10.
Figure 3B:
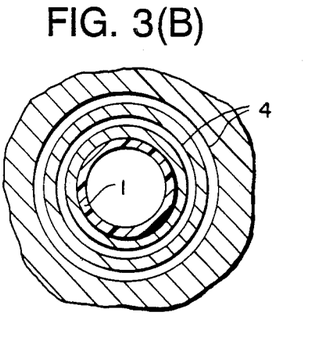
Figure 3C:
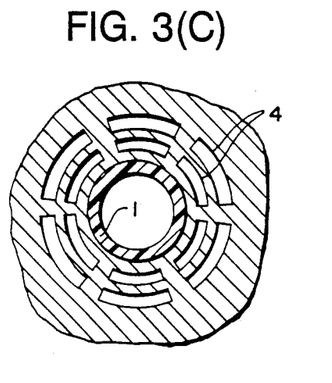
Figure 4A:
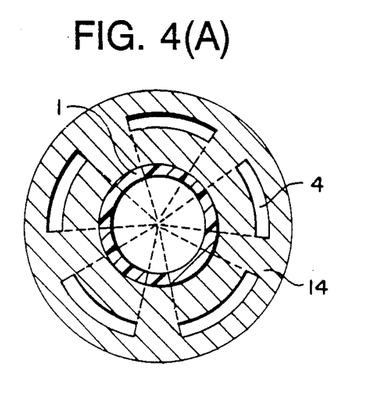
FIGS. 4A and 4B are schematic diagrams showing the ideas of effective grooves defined in the specification of the present invention.
Figure 4B:
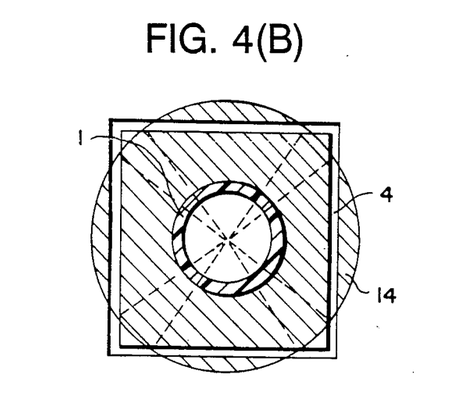

As shown in FIGS. 4A and 4B, it is preferable that the grooves 4 in each of the above-mentioned preferable areas of the matching surfaces be provided so that the sum of the length of each of such arcuate portions portions of the annular cavity in horizontal section that is defined by two straight lines each connecting together the center of this annular cavity and either of the ends of a corresponding groove, is not less than $\frac{1}{2}$, especially, $\frac{3}{4}$ of a total outer circumference of the annular cavity in horizontal section. In the case of grooves of a large width which extend over both the preferable area and the area out of this preferable area, only the portions of the grooves that are within the preferable area may satisfy these conditions. The specially preferable grooves are one or at least two circular grooves formed substantially concentrically with respect to the annular cavity in the portions of the matching surfaces which are within 20 mm, especially, 15 mm from the outer circumference of the annular cavity, for example, such grooves as shown in FIGS. 3A and 3B, which are specially effective. The partially cut grooves shown in FIG. 3C also have substantially the same effect, and are preferable as well.

According to the present invention, the width of a single groove is preferably not less than 0.15 mm, and more preferably not less than 0.3 mm. In the case where two or more grooves are provided, the widths thereof are such that the sum of the widths equals one of these levels, and, if the widths of the grooves are set in this manner, the similar preferable effect is obtained The upper limit of the width of the grooves is not specified, and grooves having as large a width as is permitted by the construction of a metal mold can be provided In general, in a step of obtaining a tubular molded product having a larger thickness, and a columnar molded product in an extreme case, it is preferable to set large the cross-sectional area in the effective region of the grooves.

It is necessary that the depth of the grooves in the metal mold according to the present invention be at least 0.1 mm, preferably not less than 0.2 mm, and most preferably not less than 0.3 mm. The upper limit of the depth of the grooves is not more than $\frac{1}{4}$ of the length of the annular cavity when the grooves are provided in a molding block (for example, the molding block 10 in FIG. 1) on the side of the annular cavity, and can be set as large as is permitted by the construction of the metal mold when the grooves are provided in a molding block (for example, the molding block 9 and/or 11 in FIG. 1) on the opposite side of the annular cavity.

The material for the metal mold according to the present invention is not specially limited, and known material may used. In general, the effect of the present invention can be obtained satisfactorily if the metal mold as a whole is formed out of the same material, for example, structural carbon steel, carbon tool steel, structural rolled steel and stainless steel. In order to further improve the radiating and cooling effects of the intermediate portion of a tubular (cylindrical) cavity, a molding block (for example, the molding block 10 in FIG. 1) forming the intermediate portion of the tubular (cylindrical) cavity is made of a material the heat conductivity of which is superior to that of the material for the other portion of the molding block. Forming this molding block in this manner also enables a tubular (columnar) molded product of a high dimensional accuracy to be obtained more effectively.

In order to regulate the temperature of the metal mold a liquid of, substantially the same temperature may be introduced into all the temperature regulating fluid passages 5, 6 as is conventional. Introducing fluids of different temperatures into different fluid passages may also be done, if desired. Especially, introducing a fluid into those passages near the end portions 1a of the cavity 1 having temperature of which is lower than that of the fluid flowing through the fluid passages associated with the intermediate portion of the cavity 2 (for example, the fluid passage 5 in FIG. 5) is preferably in many cases so as to improve the accuracy of the resulting molded product.

When a tubular product is molded, a conventional core cooling method may also be practiced. As a result, a tubular molded product having both highly accurate cylindricity and roundness can be obtained. Accordingly, using such a core cooling method additionally produces a beneficial effect.

Some examples of tubular (columnar) molded products to which the metal mold according to the present invention can be applied will now be described with reference to their illustrations.

Figure 6A:
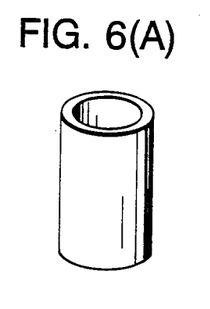
Figure 6B:
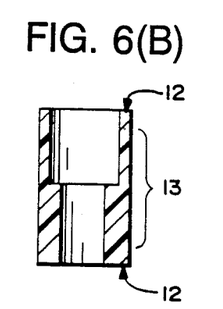
Figure 7A:
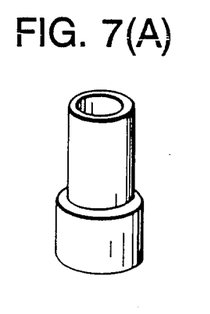
Figure 7B:
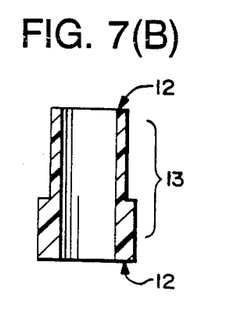
Figure 8A:
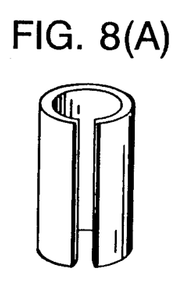
Figure 8B:
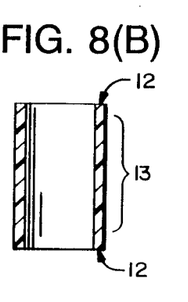
Figure 9A:
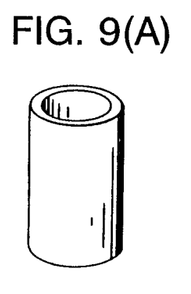
Figure 9B:
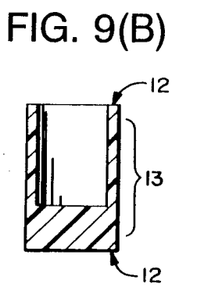
Figure 10A:
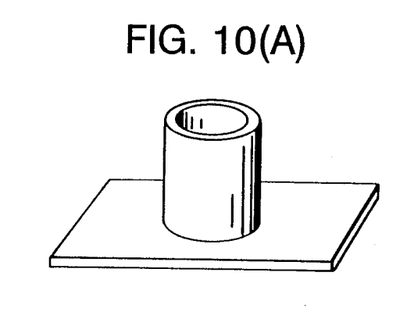
Figure 10B:
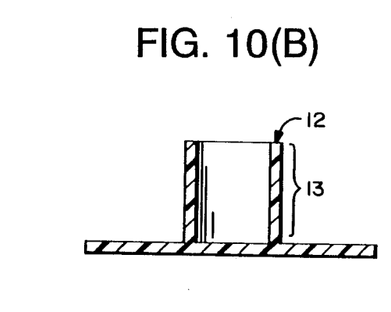
Figure 11A:
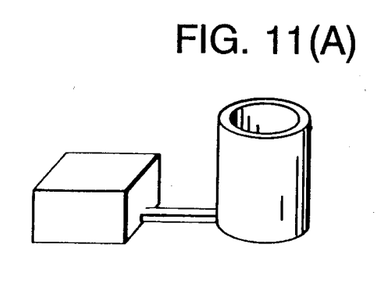
Figure 11B:
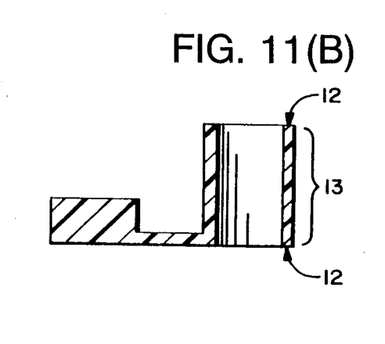
Figure 12A:
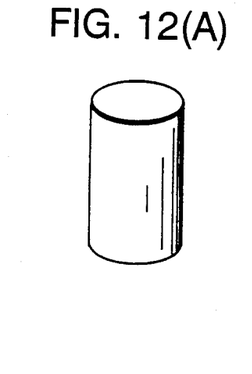
Figure 12B:
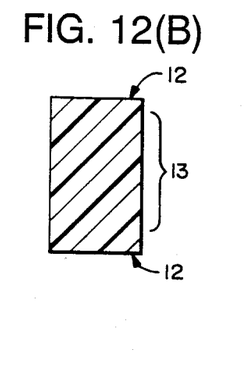
Figure 13A:
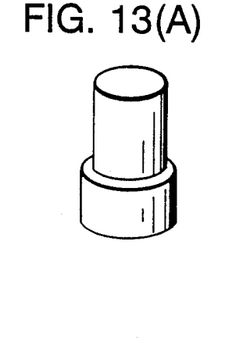
Figure 13B:
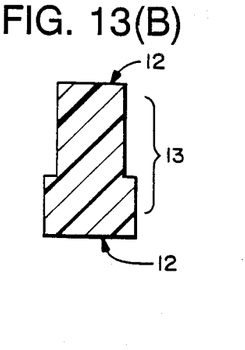
Figure 14A:
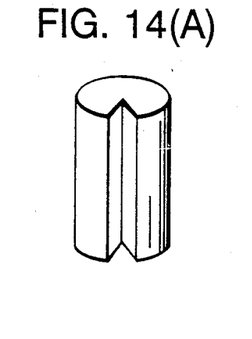
Figure 14B:
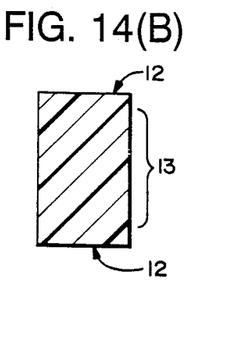

The tubular (columnar) molded products according to the present invention include not only a product consisting of a complete tubular (columnar) body as shown in FIG. 5 (or FIG. 12) but also a product consisting of combination of a plurality of tubular (columnar) bodies as shown in FIGS. 6 and 7 (or FIG. 13), a product a part of which is cut off, especially, a product a part of which is cut off so that the circumferential width of the cut-off portion is not more than ¼ of the circumference of the product as shown in FIG. 8 (or FIG. 14), a product consisting of a combination of a tubular body and a columnar body and a product consisting of a tubular body one end of which is closed as shown in FIGS. 9 and 10, respectively, and a product a part of which consists of a tubular (columnar) body integrally formed with the other part thereof as shown in FIG. 11. Namely, molded products having a tubular (columnar) part are all included in the molded products according to the present invention.

The present invention is effective in improving the dimensional accuracy, especially, the cylindricalness of a tubular (columnar) portion of any of these molded products The present invention has a remarkable effect on a tubular molded product the inner and outer diameters of which are constant throughout the whole thereof as shown in FIG. 5, and a molded product the shape of which is very similar to that of such a molded product.

The larger the wall thickness of the tubular body of a molded product is, the more the intermediate portion thereof is deformed due to the warp and shrinkage thereof. Accordingly, the present invention is more effective on a molded product having a lower wall thickness/outer diameter ratio. Even when this ratio is high, i.e., even in an extreme case where a molded product has a columnar body, the metal mold according to the present invention has a good effect.

The molded product in which the degrees of warp and shrinkage are low, and in which the effect of the present invention is specially large, is a tubular molded product the wall thickness/ outer diameter ratio of which is not higher than ⅓.

Although the reasons why providing grooves in the portions of the matching surfaces which are close to the end portions of an annular (cylindrical) cavity is effective as mentioned in the previous paragraph of the specification of the present invention in improving the cylindricalness of the resultant tubular (columnar) molded product are not perfectly clear, the inventor of the present invention infers as follows.

The process of solidification of a molten resin packed in a mold for the production of a tubular (columnar) molded product will now, be discussed. The range in which the radiant heat from the outer circumferences of the end portions (for example, the portions 12 in FIG. 5) of a tubular (columnar) body is diffused is great, and therefore the molten resin close to these portions is quickly hardened. However, the range in which radiant heat from the intermediate portion (for example, the portion 13 in FIG. 13) of the tubular (columnar) body is diffused is limited, so that the molten resin in this portion is not hardened quickly as compared with the molten resin in both end portions.

Therefore, if molten resin is molded in a conventionally used metal mold, the end portions of the tubular (columnar) body of the resin are hardened earlier and assume dimensions which are closer to those of the corresponding portions of the metal mold. The intermediate portion, on the other hand, is hardened later. The resin thus shrinks and assumes a shape having dimensions smaller than those of the corresponding portion of the metal mold.

On the other hand, according to the metal mold of the present invention, which is provided with grooves in the portions of the matching surfaces thereof which are close to the end portions of the annular (cylindrical) cavity, the radiant heat from the end portions of the tubular resin is more limited. Thus, solidification rate of the end portions (especially, the circumferences of the end portions) and that of the intermediate portion become almost equal. As a result, the resin as a whole shrinks uniformly. It is thus believed that this functional attribute contributes to the highly accurate cylindricity and roundness of the molded product that ensue.

It is presumed that the effect of the present invention is due in large part to the above-described construction. The present invention can be applied to any thermoplastic resin so long as it generates molding shrinkage, and is capable of providing highly accurate tubular (columnar) molded products. The present invention has a specially good improvement effect especially on crystalline resins having a high molding shrinkage rate, for example, a polyacetal resin, a polyester resin and a polyamide resin.

EXAMPLES

The present invention will now be described more in detail on the basis of the following nonlimiting examples.

EXAMPLES 1-7 and COMPARATIVE EXAMPLES 1-2

Tubular products were molded by using metal molds prepared for this purpose and shown in FIG. 1, which molds were provided with grooves 4 of various shapes extending so as to surround the end portions 1a of an annular cavity 1. The details of the shapes of the grooves in the metal molds are as shown in FIGS. 3A-3C, and the sizes thereof as shown in the marginal space of Table 1. The shapes of the grooves were varied in a desired manner by packing solder in predetermined portions of the grooves. In the metal molds used in these Examples, the molding blocks were all made of stainless steel, and the tubular molded products obtained were 6 mm in outer diameter, 4.8 mm in inner diameter and 15 mm in length. The resin used in these Examples was a polyacetal resin (Duracon VC-10 manufactured by the Polyplastics Co., Ltd.), and the molding conditions were as follows.

Molding conditions

| | |
|---|---|
| Temperature of the cylinder | 190° C. |
| Temperature of the metal mold (cooling liquid temp.) | 30° C. |
| Injection pressure | 1200 kg/cm$^2$ |
| Dwelling | 600 kg/cm$^2$ |
| Injection speed | 1 m/min |
| Molding cycle | |
| Injection and pressure retaining time | 8 seconds |
| Cooling time | 5 seconds |
| | (Total 13 seconds) |

The molded products obtained were subjected to the measurement of cylindricalness according to JIS B 0621, and expressed as a deviation of the outer diameter of the end portions of a tubular body from that of the intermediate portion thereof. The results are shown in Table 1.

For comparison's sake, tubular products were molded in the same manner by using a metal mold having no grooves on the matching surfaces, and a metal mold having grooves filled completely with solder, and the resultant molded products were evaluated. The results are also shown in Table 1.

TABLE 1

| | | | Cylindricalness* | |
|---|---|---|---|---|
| | Type of gate side grooves | Type of far-gate grooves | Gate side portion | Far-gate side portion |
| Example | | | | |
| 1 | Type shown in FIG. 3C with solder not packed. | Type shown in FIG. 3C with solder not packed. | 6 | 7 |
| 2 | Type shown in FIG. 3C with solder not packed. | Type shown in FIG. 3C with solder packed in the outer grooves. | 7 | 12 |
| 3 | Type shown in FIG. 3C with solder not packed. | Type shown in FIG. 3C with solder packed in the inner grooves. | 7 | 18 |
| 4 | Type shown in FIG. 3C with solder not packed. | Type shown in FIG. 3B with solder not packed. | 6 | 6 |
| 5 | Type shown in FIG. 3C with solder not packed. | Type shown in FIG. 3B with solder packed in the outer groove. | 6 | 9 |
| 6 | Type shown in FIG. 3C with solder not packed. | Type shown in FIG. 3B with solder packed in the inner groove. | 7 | 14 |
| 7 | Type shown in FIG. 3C with solder not packed. | Type shown in FIG. 3A | 6 | 12 |
| Comparative Example | | | | |
| 1 | No grooves | No grooves | 28 | 31 |
| 2 | Type shown in FIG. 3C with solder packed in all grooves. | Type shown in FIG. 3C with solder packed in all grooves. | 28 | 32 |

* (Outer diameter of an end portion of a tubular molded product) − (Outer diameter of an intermediate portion of the same product)

Size of the groove

Type shown in FIG. 3A

A groove provided in the portion of a matching surface which is within 1.0-1.5 mm from the outer circumference of an annular cavity, and having a width of 0.5 mm and a depth of 0.5 mm.

Type shown in FIG. 3B

A groove 1.0 mm in width and 0.5 mm in depth provided in the portion of a matching surface which is 1.0-2.0 mm from the outer circumference of an annular cavity, and a groove of 1.0 mm in width and 1.0 mm in depth provided in the portion of the matching surface which is within 3.0 mm-4.0 mm from the outer circumference of the same cavity.

Type shown in FIG. 3C

Intermittent grooves 1.0 mm in width and 0.5 mm in depth provided in the portions of a matching surface which are 1.0-2.0 mm and 3.0-4.00 mm from the outer circumference of an annular cavity respectively.

EXAMPLE 8

A test was conducted under the same conditions as in Example 3 by using a metal mold having the same construction as the metal mold in Example 3 except that the material for the molding block 10, which defines mainly the intermediate portion of the cavity 1 in which a tubular product is molded, was a beryllium-copper alloy having a high heat conductivity.

The cylindricalness (difference between the outer diameters of the end and intermediate portions of the annular body) of the molded product obtained was 5 $\mu$m on the gate side and 13 $\mu$m on the far-gate side, which indicated a further improvement in the accuracy of the product.

EXAMPLE 9

The molding was done in the same manner as in Example 3 except that the temperature of a metal mold, which was the same metal mold as shown in FIG. 1, was regulated by introducing a liquid of 30° C. into a fluid passage 5 and a liquid of 60° C. into a fluid passage 6, and the resultant molded product was evaluated.

The cylindricalness (difference between the outer diameters of the end and intermediate portions of the annular body) of this molded product was determined. It was 5 μm on the gate side and 12 μm on the far-gate side, which indicated a further improvement in the accuracy of the molded product.

EXAMPLE 10 AND COMPARATIVE EXAMPLE 3

Figure 3D:
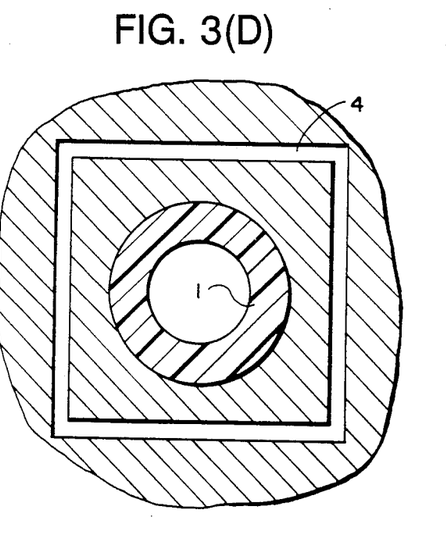

A groove 1.00 mm in width and 1.0 mm in depth having the shape shown in FIG. 3D was provided in the portion (gate side alone) designated by a reference numeral 4 and having the shortest distance of 2.00 mm from the outer circumference of the annular cavity, of the matching surface of a metal mold having the same construction as shown in FIG. 2 and designed for obtaining a tubular molded product of 12 mm in outer diameter, 6 mm in inner diameter and 30 mm in length. A polyacetal resin (Duracon M270 manufactured by the Polyplastics Co., Ltd.) was molded under the following molding conditions by using this metal mold, and the molded product obtained was subjected to the measurement of cylindricalness. As a result, it was found that the difference between the outer diameters of the end and intermediate portions of the tubular body was 36 μm. On the other hand, the cylindricalness (gate side) of a molded product obtained when a metal mold in which such a groove was not provided was used was 78 μm. The effect obtained by using a metal mold in which a groove was provided according to the present invention was remarkable.

Molding conditions

| | |
|---|---|
| Injection pressure | 1400 kg/cm² |
| Dwelling | 750 kg/cm² |
| Injection speed | 1 m/min |
| Temperature of the resin | 200° C. |
| Temperature of the metal mold (cooling liquid temp.) | 60° C. |
| Molding cycle | |
| Injection and dwelling time | 10 seconds |
| Cooling time | 5 seconds |
| Intermediate time | 3 seconds |

EXAMPLE 11 AND COMPARATIVE EXAMPLE 4

The size of a core was changed so that the inner diameter of the portion of the metal mold used in Example 10 in which a tubular product was to be molded became 3 mm, and the other conditions were set identical with the corresponding conditions in Example 10. A test was then conducted. The cylindricalness of the molded product obtained was measured. The difference between the outer diameters of the end and intermediate portions of the tubular body was 75 μm. On the other hand, the cylindricalness of a molded product obtained under the same conditions except that a groove was not provided in the metal mold was 121 μm. The cylindricalness of a tubular molded product having a smaller inner diameter (larger wall thickness), i.e. being more similar to a columnar molded product is influenced more greatly by the molding shrinkage. Nevertheless, it has been certainly ascertained that providing grooves in a metal mold according to the present invention has excellent effect in minimizing this bad influence.

As is clear from the above description and Examples, a tubular (columnar) product molded by using a metal mold provided with grooves formed in the portions of the matching surfaces thereof which are close to the end portions of the annular (cylindrical) cavity, in such a manner that the grooves surround the end portions of the cavity, has a very high dimensional accuracy, especially, a very high cylindricalness with the physical properties and outer appearance thereof not spoiled at all. This makes it unnecessary to subject a molded product to a subsequent cutting process which is economically disadvantageous. Accordingly, the productivity of molded products is improved, and the manufacturing cost decreases greatly.

I claim:

1. A mold for injection molding of a cylindrical thermoplastic product comprising:

a mold member defining a cylindrical mold cavity which establishes a mold cavity axis, said mold member also defining opposing end portions of said mold cavity that are essentially transverse to said mold cavity axis, and an intermediate cavity portion disposed between said opposing end portions;

runner means in communication with said defined cavity allowing molten thermoplastic resin to be injected into said cavity, whereby said product is formed upon soldification of said injected thermoplastic resin within said mold cavity; and means for equalizing radiant heat loss of said molten thermoplastic resin injected into said mold between said opposing mold cavity end portions and said intermediate cavity portion, and to thereby minimize dimensional distortion of said thermoplastic product, wherein said means for equalizing radiant heat loss of said molten thermoplastic resin includes at least one groove formed in said mold member in annular relationship to each said cavity end portion.

* * * * *

UNITED STATES PATENT AND TRADEMARK OFFICE
CERTIFICATE OF CORRECTION

PATENT NO. : 4,973,242

DATED : November 27, 1990

INVENTOR(S) : Mitsuhiro TSUKADA

It is certified that error appears in the above-identified patent and that said Letters Patent is hereby corrected as shown below:

Column 1, line 9, after "thermoplastic" insert --products--;
        line 10, after "to" insert --molded--;
        line 11, delete "of molded product" and after "such" insert --a--;
        line 17, delete "Since techniques for molding a";
        line 18, delete "tubular product are more complicated.";
        line 29, after "stock." change "serious" to --Serious--.

Column 2, line 18, after "economically" delete "advantages cutting" and insert --advantageous--.

Column 3, line 18, after "the" change "cylindricalness" to --cylindricity--;
        line 19, after "not" insert --at a--;
        line 22, after "has" insert --the--;
        line 53, after "1" and before "This" insert a period (.);
        line 64, delete "an desire" and insert --any desired--.

Column 4, line 16, after "arcuate" delete "portions";
        line 26, after "conditions." delete "The specially preferable" and insert --Especially preferred--.

Column 5, line 13, after "mold" insert a comma (,) and after "of" delete the comma (,);
        line 55, after "the" delete "cylindricalness" and insert --cylindricity--;
        line 60, after "the" delete "whole" and insert --entire length--.

UNITED STATES PATENT AND TRADEMARK OFFICE
CERTIFICATE OF CORRECTION

Page 2 of 2

PATENT NO. : 4,973,242
DATED : November 27, 1990
INVENTOR(S) : Mitsuhiro TSUKADA It is certified that error appears in the above-identified patent and that said Letters Patent is hereby corrected as shown below:

Column 6, line 14, delete "cylin-";
        line 15, delete "dricalness" and insert --cylindricity--;
        line 20, after "now" delete the comma (,).

Column 8, line 63, delete "cylindricalness" and insert --cylindricity--.

Column 9, line 10, after "The" change "cylindricalness" to --cylindricity--;
        line 38, after "the" (second occurrence" change "cylindricalness" to --cylindricity--.

Column 10, line 9, after "The" change "cylindricalness" to --cylindricity--;
        line 13, after "the" change "cylindricalness" to --cylindricity--;
        line 15, after "The" delete "cylindri-" and insert --cylindricity--;
        line 16, delete "calness";
        line 30, after "high" delete "cylindricalness" and insert --cylindricity--.

Signed and Sealed this

Eleventh Day of January, 1994

Attest:

BRUCE LEHMAN

*Attesting Officer*      *Commissioner of Patents and Trademarks*